(12) United States Patent
Martin et al.

(10) Patent No.: US 11,732,576 B2
(45) Date of Patent: Aug. 22, 2023

(54) SYSTEM, APPARATUS AND METHOD FOR DETECTING WIRELINE TOOLS

(71) Applicant: Intelligent Wellhead Systems Inc., Sturgeon County (CA)

(72) Inventors: Bradley Robert Martin, Red Deer (CA); Aaron Mitchell Carlson, Lake Country (CA)

(73) Assignee: Intelligent Wellhead Systems Inc., Calgary (CA)

( * ) Notice: Subject to any disclaimer, the term of this patent is extended or adjusted under 35 U.S.C. 154(b) by 735 days.

(21) Appl. No.: 16/480,118

(22) PCT Filed: Apr. 18, 2018

(86) PCT No.: PCT/CA2018/050466
§ 371 (c)(1),
(2) Date: Jul. 23, 2019

(87) PCT Pub. No.: WO2018/191820
PCT Pub. Date: Oct. 25, 2018

(65) Prior Publication Data
US 2020/0003045 A1    Jan. 2, 2020

Related U.S. Application Data

(60) Provisional application No. 62/486,719, filed on Apr. 18, 2017.

(51) Int. Cl.
*G01B 7/02* (2006.01)
*E21B 47/092* (2012.01)
*G01B 7/12* (2006.01)
*E21B 19/00* (2006.01)

(52) U.S. Cl.
CPC .............. *E21B 47/092* (2020.05); *G01B 7/02* (2013.01); *G01B 7/12* (2013.01); *E21B 19/008* (2013.01)

(58) Field of Classification Search
CPC ....... E21B 47/092; E21B 19/008; G01B 7/02; G01B 7/12; G01B 1/00; G01B 3/00;
(Continued)

(56) References Cited

U.S. PATENT DOCUMENTS 4,179,817 A    12/1979 Lavigne et al.
6,333,699 B1 *  12/2001 Zierolf ................. E21B 17/006
                                                          705/65
(Continued)

FOREIGN PATENT DOCUMENTS

CN        102733797 A    10/2012
RU         2272907 C2     3/2006
(Continued)

OTHER PUBLICATIONS

International Search Report issued in International Application No. PCT/CA2018/050466 dated Jun. 29, 2018 (4 pages).
(Continued)

*Primary Examiner* — Feba Pothen
*Assistant Examiner* — Brent J Andrews
(74) *Attorney, Agent, or Firm* — Osha Bergman Watanabe & Burton LLP (57) ABSTRACT

The present disclosure provides a system, an apparatus and a method for detecting line-attached tools in an above-surface portion of a well for use during well-work overs and/or interventions. The system includes the apparatus which comprises: a body for housing at least one magnetic-field generator and at least one magnetic-field sensor; and a tubular portion that is configured to be housed within the body. The tubular portion has a bore for receiving the line-attached tools and the at least one magnetic-field sensor is configured for detecting changes in the magnetic field caused by the line-attached tool approaching, moving through and/or moving away from the body. The system
(Continued)

may further include a processor unit for receiving one or more signals from the at least one magnetic-field sensor and for determining the location and/or one or more dimensions of the line-attached tool while approaching, moving through or moving away from the body.

7 Claims, 7 Drawing Sheets

(58) Field of Classification Search
CPC ... G01B 5/00; G01B 7/00; G01B 9/00; G01B 11/00; G01B 13/00; G01B 15/00; G01B 17/00; G01B 21/00; G01B 2210/00; G01B 2290/00
See application file for complete search history.

(56) References Cited

U.S. PATENT DOCUMENTS

| | | | | |
|---|---|---|---|---|
| 7,347,261 | B2* | 3/2008 | Markel | E21B 47/092 166/66.5 |
| 2003/0052670 | A1 | 3/2003 | Miszewski | |
| 2013/0002255 | A1 | 1/2013 | Shampine | |
| 2014/0055141 | A1* | 2/2014 | Carlson | G01V 3/08 324/326 |
| 2014/0340089 | A1 | 11/2014 | Rodney | |
| 2016/0003033 | A1* | 1/2016 | Coles | E21B 19/00 73/152.58 |

FOREIGN PATENT DOCUMENTS

| | | |
|---|---|---|
| RU | 2341641 C2 | 12/2008 |
| RU | 2576627 C1 | 3/2016 |

OTHER PUBLICATIONS

Written Opinion issued in International Application No. PCT/CA2018/050466 dated Jun. 29, 2018 (4 pages).

Extended European Search Report issued in corresponding EP Application No. 18788237.8 dated Dec. 18, 2020 (12 pages).

Decision of Grant issued in corresponding RU Application No. 2019102271/03 with English translation dated Jun. 29, 2021 (18 pages).

* cited by examiner

SYSTEM, APPARATUS AND METHOD FOR DETECTING WIRELINE TOOLS

TECHNICAL FIELD

This disclosure generally relates to oil and gas well work-overs and interventions. In particular, this disclosure relates to a system, an apparatus and a method for detecting line-attached tools in an above-surface portion of a well for use during well-work overs and/or interventions.

BACKGROUND

Lines, such as wires and cables, are used in the oil and gas industry to perform well-work overs and/or interventions. There are two general types of lines that are referred to as slickline or wireline. Slickline is a wire or cable that can be used to insert a tool into a well to place, adjust or retrieve well components. Wireline is typically a cable that is also used to insert a tool into a well. Typically, wireline includes at least one electrical conductor that conducts electrical power and data to and from the tool. Wireline is often also used in well logging.

A typical approach for retrieving a line-attached tool involves pulling the line out of the well with a hydraulically powered reel upon a line truck until almost all of the line is retrieved. Then the line is given some slack and a user pulls on the line at a point between the top of the wellhead lubricator and the line truck. Then the line is pulled slowly until the user identifies tension in the line. The tension is presumed to be caused by the tool contacting the uppermost pack-off seal in the lubricator of the well. At this point, pressure control valves are closed to isolate the downhole well pressure from the lubricator. Then the pressure within the lubricator can be bled off and the lubricator can be opened to retrieve the tool. However, there can be other reasons why the user identifies tension in the line and, therefore, a misapprehension as to the location of the tool. If the tool is not actually located at or near the uppermost pack-off seal when the pressure control valves are closed the tool can be damaged and/or the line can be cut and the tool can be disconnected from the line and possibly lost down the well.

SUMMARY

The present disclosure provides a system, an apparatus and a method for detecting line-attached tools in an above-surface portion of a well for use during well-work overs and/or interventions.

Some embodiments of the present disclosure relate to an apparatus for detecting a line-attached tool that is moving through a well. The apparatus comprises: a body for housing at least one magnetic-field generator and at least one magnetic-field sensor; and a tubular portion is configured to be housed within the body. The tubular portion has a bore for receiving the line-attached tools and the sensor is configured for detecting at least one dimension of the line-attached tool while approaching, moving through or moving away from the body.

Without being bound by any particular theory, embodiments of the present disclosure may provide an operator greater certainty as to the location of a line-attached tool within an above-surface portion of a well. This certainty may reduce the incidence of false contacts and avoid having pressure or fluid control mechanisms close directly upon the line-attached tool or close upon and cut the line.

BRIEF DESCRIPTION OF THE DRAWINGS

These and other features of the present disclosure will become more apparent in the following detailed description in which reference is made to the appended drawings.

FIG. 4A shows the apparatus in a closed position with a tubular portion positioned therein; FIG. 4B shows the apparatus in a partially open and demagnetized position with the tubular portion positioned therein; and FIG. 4C shows the apparatus in a fully-open position without the tubular portion;

DETAILED DESCRIPTION

Embodiments of the present disclosure relate to a system, an apparatus and a method for detecting downhole tools that are attached to a line while the tools are being inserted into and/or withdrawn from an oil and gas well. For the purposes of this disclosure, the term "line" refers to any wire or cable that is used to deliver, withdraw and/or operate a downhole tool during a line-facilitated oil-and-gas well operation. The wires or cables may be slickline or wireline with the understanding that wireline typically comprises one or more electrical conductors. Some examples of line-facilitated operations include but are not limited to well completions, well work overs and well interventions. Some examples of line-attached tools include but are not limited to: a spang, a jar, a sinker bar, a perforation gun, running tools, pulling tools, well logging tools or a bridge plug.

Some embodiments of the present disclosure relate to a system that is installable as part of an above-the-surface portion of an oil and gas well in preparation for, during or after a line-facilitated well operation. The system comprises a lubricator and a detection apparatus. The system may be incorporated into a Christmas tree of a well and the Christmas tree is fluidly connected with the well head. The Christmas tree includes one or more valves for controlling the flow of pressurized well-fluids therethrough. The Christmas tree may also include one or more pressure-containment mechanisms, which are also referred to as blow-out preventer (BOP) systems. BOP systems include members that can be actuated into and out of a central bore of the Christmas tree to contain pressurized well-fluids. The lubricator is positioned in fluid communication with the well head and above the BOP system.

The detection apparatus generates a magnetic field and detects changes in one or more properties of the magnetic field. For the purposes of this disclosure, some of the magnetic-field properties that are detected and measured by the detection apparatus include but are not limited to: the magnetic flux density of the magnetic field, the polarity of the magnetic field and the amplitude of the magnetic field. The detected changes in one or more magnetic-field properties indicate when a line-attached tool is approaching, moving through or moving away from the magnetic field within the detection apparatus. In some embodiments of the present disclosure the detection apparatus can measure one or more dimensions of the line-attached tool as it moves towards, through and away from the magnetic field. In some embodiments of the present disclosure the detection apparatus can is positioned below the lubricator.

In some embodiments of the present disclosure, the detection apparatus comprises one or more magnetic-field generators and one or more magnetic-field sensors. The one or more magnetic-field generators generate a magnetic field that extends at least partially across a central passage of the detection apparatus, through which the line and line-attached tool move in and out of the well. The one or more magnetic-field sensors are electronically connectable to a processor, which in turn provides an output signal that alerts a user that the line-attached tool is approaching, moving through or moving away from the detection apparatus. In some embodiments of the present disclosure, the one or more magnetic-field sensors are positioned about the central aperture of the detection apparatus.

The method comprises a series of steps to identify when the line-attached tool has passed above any valves or pressure-containment mechanisms while the line-attached tool is moving through the above-surface-portion of the well. The method comprises a step of creating a magnetic field within a section of an oil-and-gas well that is above the surface. The method also comprises a step of detecting any changes in the magnetic-field strength that is caused by the line-attached tool approaching, moving through or moving away from the magnetic field. The method may also comprise a step of communicating a magnetic-field strength change signal to a processor wherein the processor generates an output signal that alerts a user that the line-attached tool is near or at the section of the well that is exposed to the magnetic field. In some embodiments, the processor is also configured to determine one or more dimensions of the line-attached tool and to provide that dimensional information within the output signal or a different dimensional output-signal.

Figure 1:
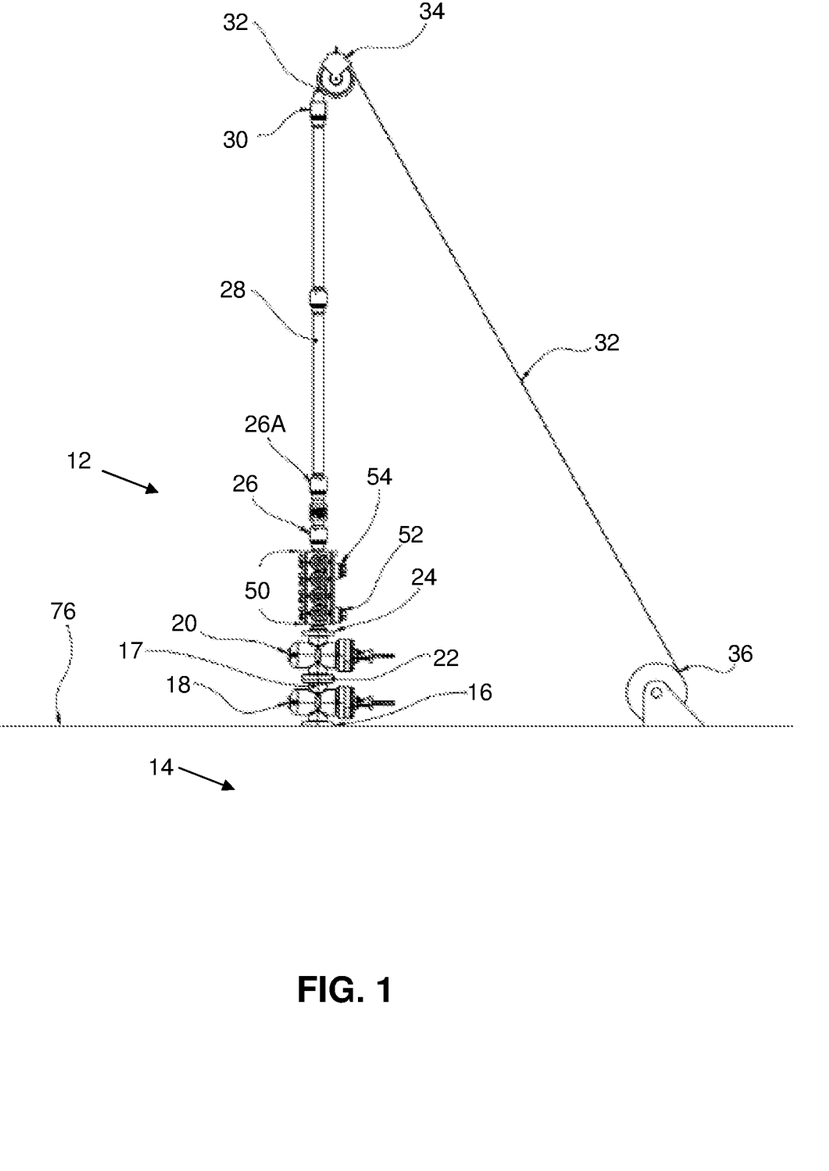
FIG. 1 is a schematic of a well with a known line system in place.

FIG. 1 shows a petroleum well 10 from which oil, gas or both may be produced that extends above and below a surface 76. The well 10 includes an above-surface portion 12 with a well head 16 from which below-the-surface portions 14 of the well 10 extend. The above-surface portion 12, which may also be referred to as a Christmas tree, includes a central conduit 17 that can be made up of one or more sections. Each section of the central conduit 17 may be connected by flange connections 22 and 24. The above-surface portion 12 may also include a lower master valve 18 and an upper master valve 20. In some embodiments of the present disclosure, above the upper master valve 20 there is a blow-out preventer (BOP) system 50 that includes at least a lower BOP 52 and an upper BOP 54. The BOPs 52 and 54 may be hydraulically actuated rams or any other type of well-pressure control system. The master valves 18, 20 and the BOP system 50 are part of the well's 10 pressure containment system. A lubricator 28 is positioned above the BOP system 50. The lubricator 28 may include a tool trap 26 and a wireline pack-off 30. Some embodiments of the present disclosure relate to a BOP system 50 that includes only one of the lower BOP 52 or the upper BOP 54 and/or only one of the master valves 18, 20.

FIG. 1 shows a line 32 moving through the top of the lubricator 28 at a rotatable shiv 34 from a spool 36. The spool 36 may rotated for delivering the line 32 into or out of the well 10. Rotation of the spool 36 may be controlled by a motor (not shown). The line 32 can be either slickline, wireline or other type of well-intervention line. The line 32 can extend through the above-surface portion 12 and into the below-surface portion 14. Although not shown, it is understood that the line 32 may have one or more of line-attached tools attached thereto. Typically, when a line-attached tool is being pulled out of the well 10, the operator will apply further tension to the line 32 between the shiv 34 and the spool 36. With this further tension, the operator expects to detect when the line-attached tool contacts the lower surface of the wireline pack-off 30. When this occurs, the operator will typically close either or both of the BOPs 52, 54 and/or one or both of the master valves 18, 20. With these pressure containment systems closed the line-attached tool can be withdrawn from the lubricator 28 without an uncontrolled flow of pressurized well-fluids, which is also referred to as a blowout. However, often times the operator may detect a false contact between the line-attached tool and the wireline pack-off 30. During a false contact the line-attached tool may not be at the top of the lubricator 28 but rather lower within the well 10. In some cases, the line-attached tool may be positioned at or below the BOP system 50. If during a false contact one or both of the BOPs 52, 54 are then closed they may damage the line-attached tool directly and/or the closed BOP 52, 54 may cut the line 32 and the line-attached tool may fall down into the below-surface portion 14 of the well 10. If a portion of the line 32 is positioned at either of the master valves 18, 20 when a false contact is detected and the relevant master valve 18, 20 is then closed that may also directly damage the line-attached tool or cut the line 32 and result in the line-attached tool falling down into the below-surface portion of the well 10.

Figure 2:
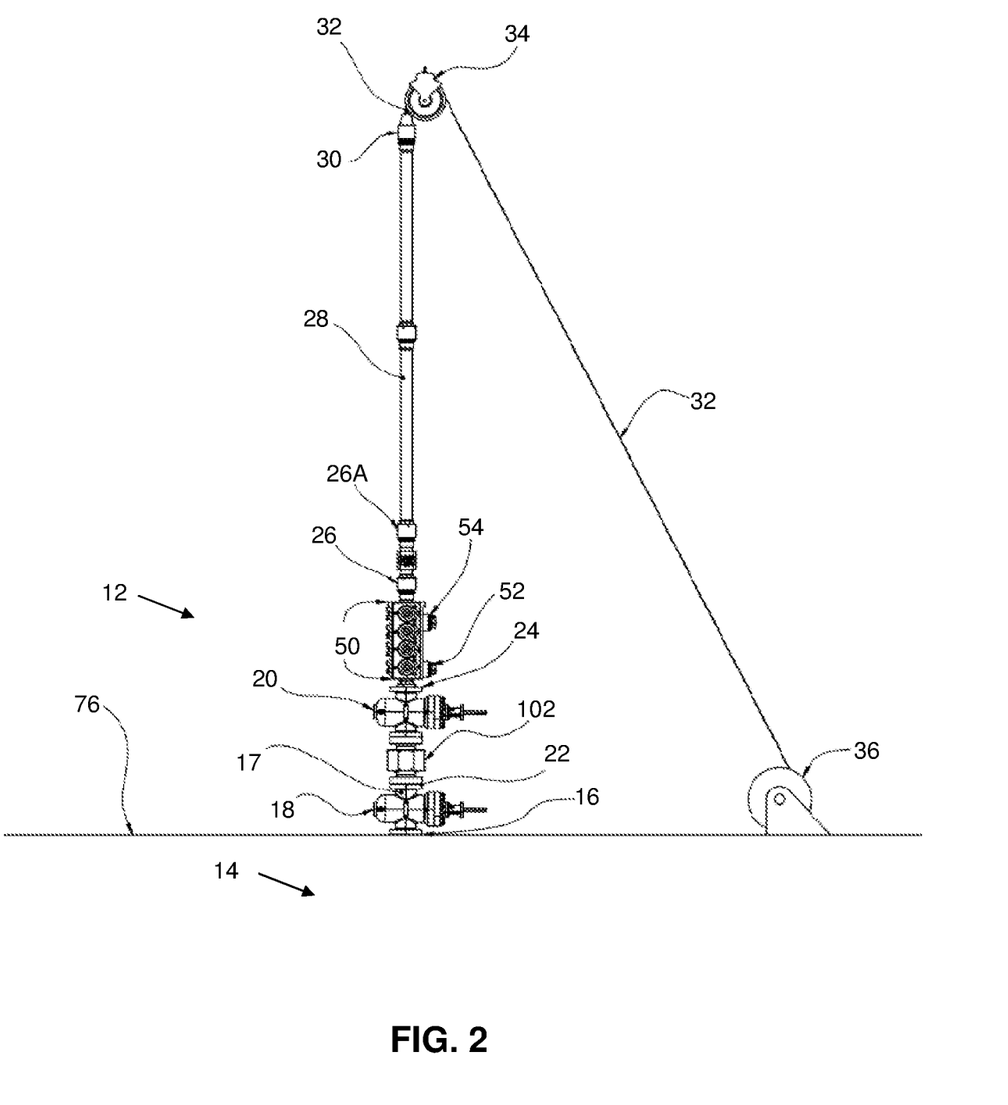
FIG. 2 is a schematic of a well with a line system according to one embodiment of the present disclosure.

FIG. 2 shows another petroleum well 100 that has many of the same features as the well 10 described above. The common features between well 10 and well 100 are shown with the same reference numbers in both figures.

Figure 3:
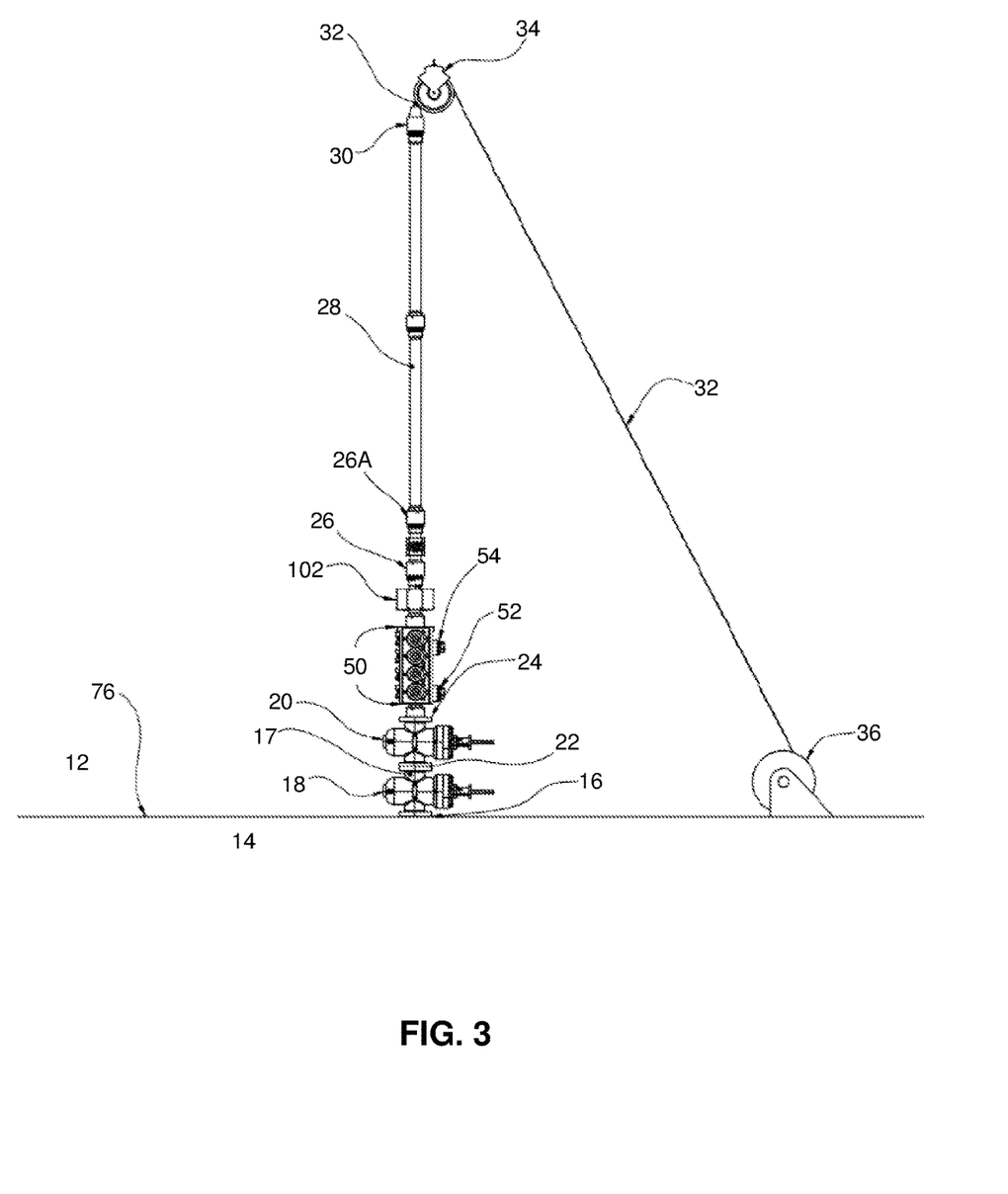
FIG. 3 is a schematic of a well with a line system according to another embodiment of the present disclosure.

The well 100 includes a detection apparatus 102 that is connectible within the above-ground portion of the well 100, 101. The detection apparatus 102 defines a central passageway 103 that is in fluid communication and generally aligned with the central conduit 17. FIG. 2 shows the detection apparatus 102 as being positioned within the above-surface section 12 between the lower master valve 18 and the upper master valve 20. FIG. 3 shows another petroleum well 101 that has the same features as the well 100. The common features between well 100 and well 101 are shown with the same reference numbers in both figures. At least one difference between the well 100 and the well 101 is the position of the detection apparatus 102. In well 101 the detection apparatus 102 is positioned above the BOP system 50 but below the lubricator 28. In these arrangements, objects such as the line 32 and any line-attached tools that are moved through the above-surface section 12 of the well 100, 101 will also move through the central passage of the detection tool 102. The following discussion will describe the detection apparatus 102 and it is understood that the detection apparatus 102 may be positioned at different locations within the above-surface section 12. In some embodiments of the present disclosure the detection apparatus 102 is positioned below the lubricator 28.

The detection apparatus 102 can generate a magnetic field and detect when a line-attached tool approaches, passes through or is moving away from the magnetic field. In some embodiments of the present disclosure the detection apparatus 102 can also detect and/or measure dimensions of the line-attached tool including at least the diameter and length of the line-attached tool.

In some embodiments of the present disclosure the detection apparatus 102 is as described in U.S. Pat. No. 9,097,813 and U.S. patent application Ser. Nos. 14/423,090 and 15/169,500, the entire disclosures of which are incorporated herein by reference.

Figure 7:
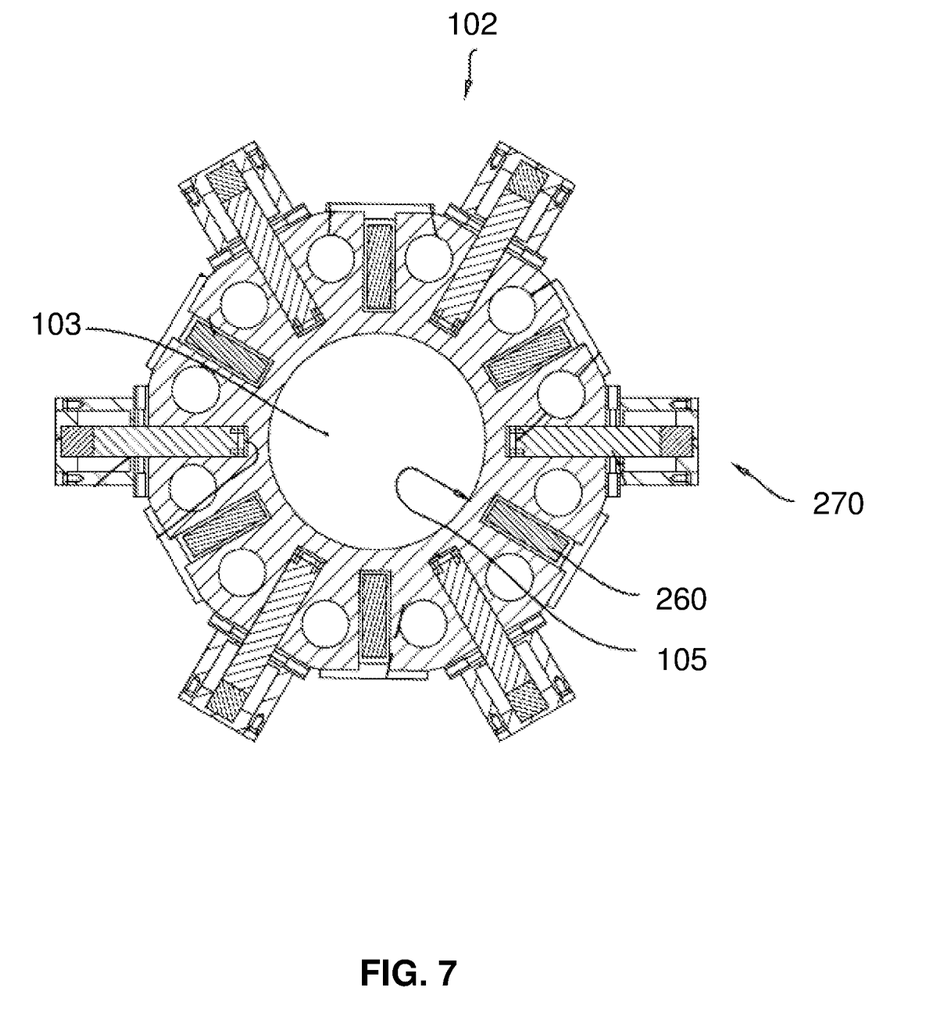
FIG. 7 shows a cross-sectional, top plan view of an apparatus for detecting line-attached tools according to an embodiment of the present disclosure.

In some embodiments of the present disclosure, the detection apparatus 102 comprises one or more magnetic-field generators 260, in the form of one or more magnets, and one or more magnetic-field sensors 270, as shown in FIG. 7. The one or more magnetic-field generators 260 are configured to generate a magnetic field that at least partially extends into a central passageway of the detection apparatus through which the line 32 and the line-attached tool pass as they are moved into and out of the well 100, 101.

The one or more magnetic-field generators generate a magnetic field that penetrates at least partially across but preferably substantially across the entire central passage of the detection apparatus 102. The magnetic field may be visualised by magnetic field lines that leave the north pole of each magnetic-field generator and return to the south pole of each respective magnetic-field generator. Either one of the poles may face the central passage of the detection apparatus 102. When magnetic field lines return from the north pole to the south pole they penetrate through the central passage. There are infinite possible return paths that the magnetic field lines may utilize to return from north to south pole, and some of those paths pass through one or more of the magnetic-field sensors. The magnetic-field sensors produce an electrical signal that relates to the strength of the magnetic field passing through it. In other words, the electrical output signal from each magnetic-field sensor relates to the number of the magnetic field lines passing through each magnetic-field sensor. Some of the return paths have lower magnetic resistivity that other paths, which causes more magnetic field lines returning through those paths.

When an object that can perturb or change one or more properties of the magnetic field, such as a section of line 32, a line-attached tool or any other ferromagnetic object approaches, moves through or moves away from the detection apparatus 102 and the magnetic field the object perturbs or alters the magnetic circuit by changing the magnetic resistivity of some of the paths that the field lines travel. This perturbation may change the number of the magnetic field lines returning through some paths. Some of the altered paths are the paths that pass through one or more of the magnetic-field sensors, which changes the number of the returning magnetic field lines that pass through the one or more magnetic-field sensors, which in turn causes changes in the output from these one or more magnetic-field sensors.

If multiple magnets are used in the detection apparatus 102, the magnets may be configured such that the same magnetic pole of each magnet faces the central passage 103 of the detection apparatus 102. The magnets create a magnetic field that corresponds to the magnetic poles facing the center of the detection apparatus 102. This magnetic field will be strongest on or near an internal wall 105 of the detection apparatus 102 that defines the central passage 103, in front of the magnets, and the strength of the magnetic field may decrease distally from each magnet. Using multiple magnets may create a substantially homogeneous and evenly distributed magnetic field that extends at least partially and, in some embodiments, substantially across the central passageway 103 of the detection apparatus 102.

The magnetic-field sensors are used to detect the strength of the magnetic field. The magnetic-field sensors may be configured to detect changes in the magnetic field strength proximal or at the center of the detection apparatus 102. The magnetic-field sensor may be positioned upon a ferromagnetic rod, which can attract the magnetic field toward the magnetic-field sensors.

This change in one or more properties of the magnetic-field, such as the magnetic-flux density, is detected by the magnetic-field sensors. When the object is closest to a particular magnetic-field sensor near the internal wall of the detection apparatus 102, most of the magnetic field directed towards that particular magnetic-field sensor is drawn toward the object, which causes that particular magnetic-field sensor to detect less of the magnetic-field strength. As the ferromagnetic object moves away from the particular magnetic-field sensor, the magnetic field strength detected by the magnetic-field sensor increases drastically depending on how far the surface of the ferromagnetic object is. By observing the magnetic field strength detected by a particular magnetic-field sensor, the distance between the surface of the ferromagnetic object and the magnetic-field sensor can be determined.

The absolute magnetic field strength read by the magnetic-field sensors depends on the strength of the magnets positioned within the detection apparatus 102. However, changes in the magnetic-field strength within the detection apparatus 102 can be due to the presence of a ferromagnetic object and the magnitude of those changes can depend on the dimensions and/or material properties of the ferromagnetic object and its location within the detection apparatus 102.

When multiple magnets and multiple magnetic-field sensors 270 are used, the diameter and the position of the center of the ferromagnetic object may be found by determining the distance between the surface of the ferromagnetic object and each magnetic-field sensor.

The detection apparatus 102 can stream the magnetic-field strength readings from the different magnetic-field sensors to a processor unit that converts these readings into ferromagnetic object-to-sensor distances. These distances may then be used to calculate various dimensions of the ferromagnetic object including at least the diameter, length and the center coordinates. The processor unit can send a visual representation of these calculated dimensions in real-time to an operator's screen.

The conversion of the magnetic-field strength reading to a distance is done by comparing the magnetic-field strength readings to known magnetic-reading curves that were obtained under known conditions and known distances for known sizes of ferromagnetic objects. To convert the distances obtained from different magnetic-field sensors within the detection apparatus 102 to position and diameter information, the processor unit may use the Apollonius theory and/or the circle equation may be used.

For example, one embodiment of the detection apparatus 102 includes a first sensor array that includes one or more sensor units and one or more magnets. Some embodiments of the detection apparatus 102 include multiple sensor arrays. Within the first sensor array, the sensor units and the magnets are arranged in an alternating pattern, but this alternating pattern is not required.

The sensor array may comprise a body with a plurality of sensor bores therein each adapted to receive an individual sensor unit therein. In some embodiments of the present disclosure, the sensor unit comprises a sleeve and a sensor. The body may be an annular or ring-shaped spool having the inner surface and an outer surface that extend between a top surface and a bottom surface. The inner and outer surfaces are substantially cylindrical about a central passage. When the detection apparatus 102 is integrated into the well 100, 101, the central passage may be co-axial with a central passage of the other components of the above-surface portion 12 of the well 100, 101. The inner surface defines a central passage that extends therethrough, which may be sized and shaped to receive the line 32 and any line-attached tools, which can be of various dimensions and sizes. In some embodiments of the present disclosure, the top surface and the bottom surface may be substantially planar along a plane normal to the central passage. Optionally either or both of the top surface and the bottom surface may include a seal groove that extends annularly therearound for receiving a seal, as is known in the art.

Figure 4:
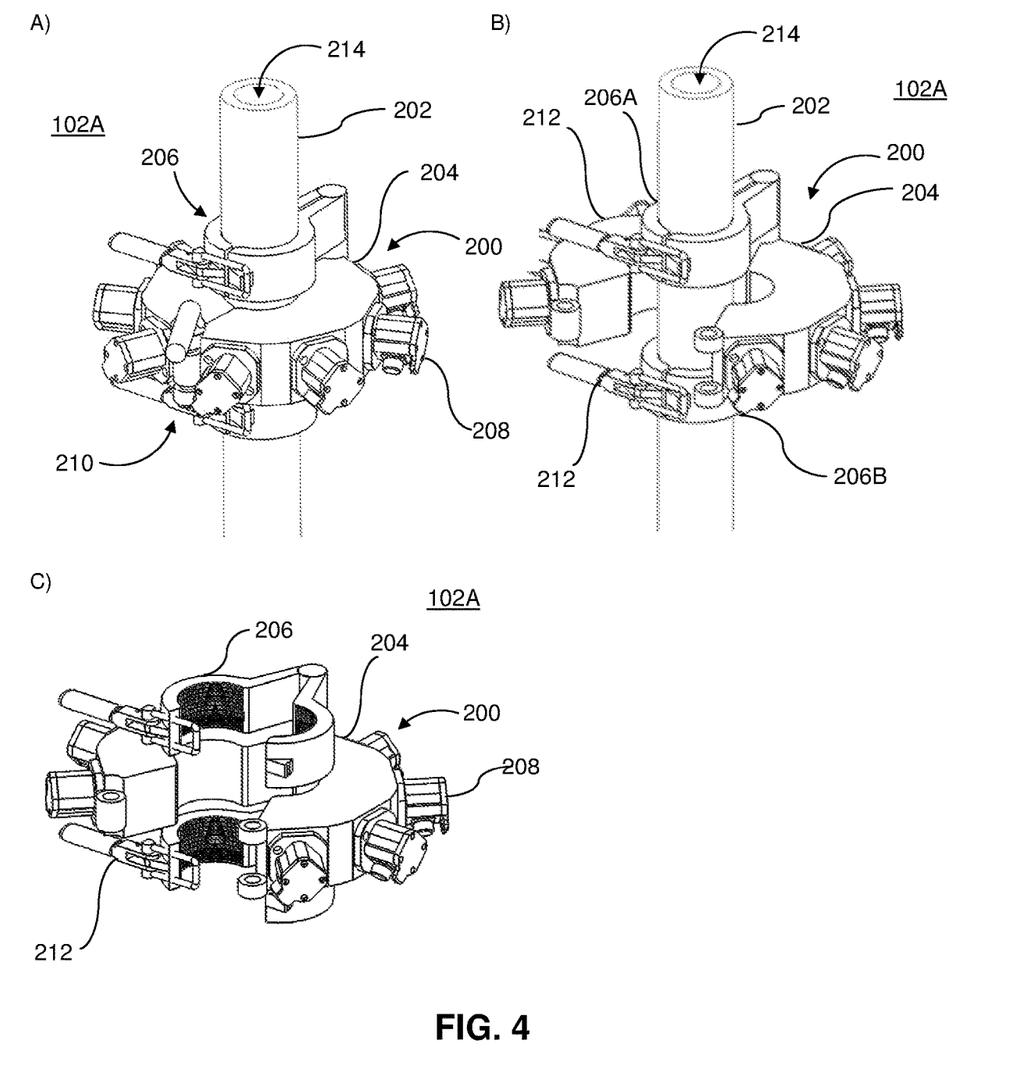
FIG. 4 is an isometric view of an apparatus for detecting line-attached tools according to an embodiment of the present disclosure.

Other embodiments of the present disclosure comprise a detection apparatus 102A as shown in FIG. 4A, FIG. 4B and FIG. 4C. The detection apparatus 102A has the same functions and many of the same components as the detection apparatus 102 described above. Furthermore, the detection apparatus 102A may be similarly positioned within the above-surface-portion 12 as the detection apparatus 102.

As shown in FIG. 4A the detection apparatus 102A comprises a body 200 and a tubular portion 202 that is positionable within the body 200. The body 200 can be configured to retain the tubular portion 202. The body 200 can move between a closed position (as shown in FIG. 4A), a partially-open position (as shown in FIG. 4B) and a fully-opened position (as shown in FIG. 4C). In some embodiments of the present disclosure the body 200 may comprise a first body 204 and a second body 206. The first body 204 comprises one or more magnetic-field generators and one or more magnetic-field sensors that can be housed within bores (not shown) of the first body 204. Each bore may be covered with a bore cap 208. The bore caps 208 can ensure that the magnetic-field generators and the magnetic-field sensors are contained within their respective bores. The magnetic-field generators can be magnets that create a magnetic field proximal to the first body 204. Some examples of the magnets include but are not limited to: one or more rare earth magnets, one or more magnetized ferromagnetic bodies or one or more electromagnets. The magnetic-field sensors can detect perturbations in the magnetic field and/or the magnetic flux proximal the first body. The magnetic-field sensors are electronically connectible to the processor unit (not shown) to generate a processor output that identifies when a line-attached tool is approaching, moving through or move away from the magnetic field. The magnetic-field sensors can also detect at least one dimension of the line-attached tool that is perturbing the magnetic field including one or more of the cross-sectional diameter, length and profile and this dimensional information can also be included in the processor output.

The first body 204 can include an actuating member (not shown) that allows the first body 204 to move between a closed position (as shown in FIG. 4A) and an open position (as shown in FIG. 4B and FIG. 4C). For example, the actuating member may be a hinge and the body 204 may be a clam-shell type of arrangement. The first body 204 may also include one or more connectors 210 that can hold the first body 204 in the closed position. While FIG. 4A shows the connector 210 as a pin and slot arrangement, other types of connectors 210 are contemplated.

The second body 206 may comprise an upper second body 206A that is positioned above the first body 204 and a lower second body 206B that is positioned below the first body 204. The upper bodies 206A, 206B can also move between a closed position (as shown in FIG. 4A and FIG. 4B) and an open position (as shown in FIG. 4C). When the first body 204 and the second body 206 are both open, the body 200 is in the fully-opened position. The second bodies 206A, 206B may also include actuating members and connectors 212 that allow the second bodies 206A, 206B to move between the open and closed positions and to hold the second bodies 206A, 206B in the closed position, respectively.

In some embodiments of the present disclosure, the tubular portion is configured to be housed within the body 200. The tubular portion 202 can have a central bore 214 through which the line 32 and any line-attached tools may be received and pass therethrough. The tubular portion 202 may be made of a non-ferromagnetic material, metal or alloy that comprises one of nickel, chromium, iron or combinations thereof. One non-limiting example of such a non-ferromagnetic material is INCONEL® (INCONEL is a registered trade-mark of Vale Canada Limited).

In some embodiments of the present disclosure the one or more magnetic field generators may be electromagnets and when the first body 204 of the body 200 is in the closed position, the magnetic field generators may be activated and the magnetic field is generated. When the first body 204 is in the open position the magnetic field generators are off.

In some embodiments of the present disclosure, the body 200 may comprise one or more sections that can be connected together to form a complete body 200 that is held together by multiple connectors 212. In these embodiments the body 200 does not include an actuating member.

Figure 5:
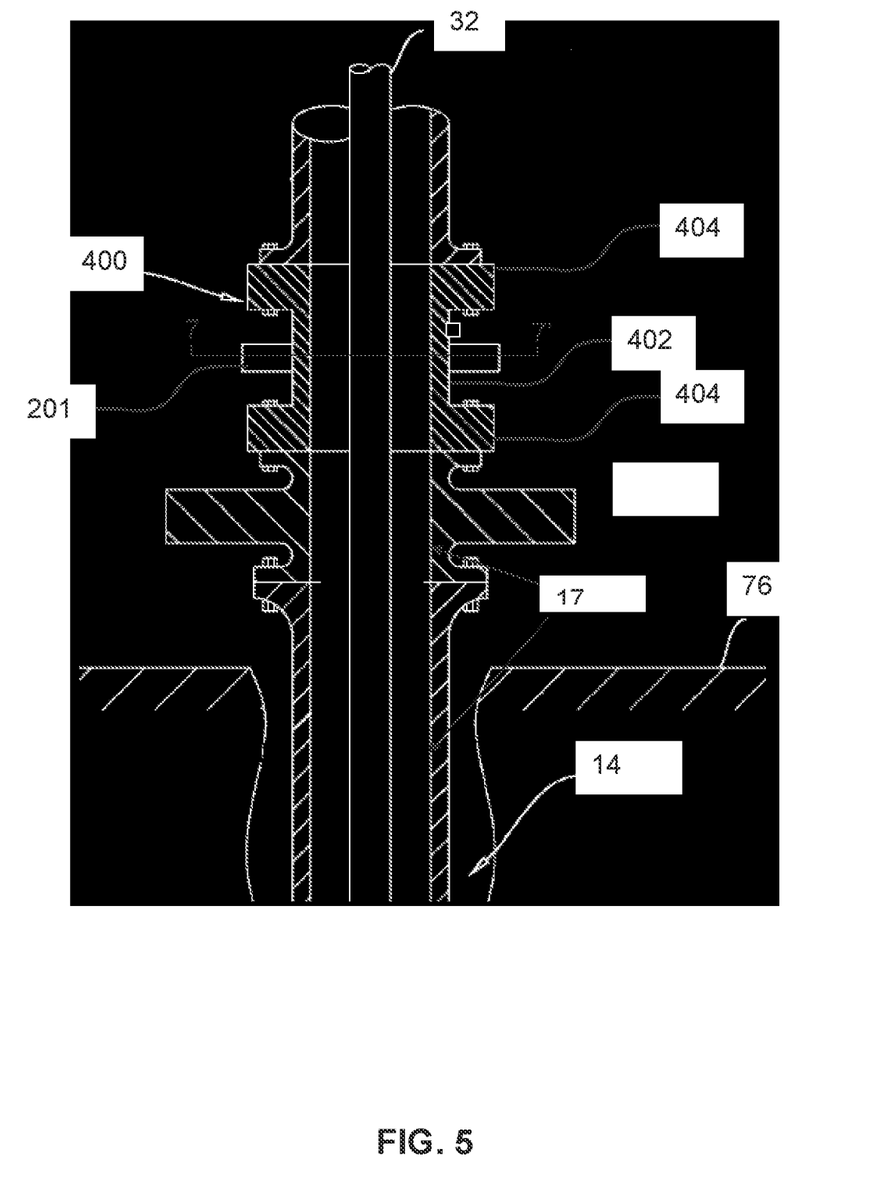
FIG. 5 shows another embodiment of an apparatus for detecting line-attached tools according to an embodiment of the present disclosure for use with the coiled-tubing system of FIG. 1.

FIG. 5 shows another example of a detection apparatus 400 that has many of the same components as the detection apparatus 102 described herein above. Components that are the same between the different detection apparatus 102 and 400 are referred to in FIG. 5 using the same reference numbers as used in the other figures herein. The detection apparatus 400 shown in FIG. 5 is similar to the apparatus described in the applicant's prior patent application WO 2017/205955 entitled APPARATUS AND METHOD FOR MEASURING A PIPE WITHIN AN OIL WELL STRUCTURE, the entire disclosure of which is incorporated herein by reference. Briefly, the detection apparatus 400 comprises a tubular body 402 that defines a central passage between first and second ends. The tubular body 402 has at least an outer surface that is formed of a non-magnetic material. In some embodiments of the present disclosure, some or all of the tubular body 402 is formed of a non-magnetic material. Each of the first and second ends has a flange 404 that extends outwardly therefrom, substantially perpendicular to the central passage. The flanges are connectible with other components of the well 100 so that the central passage is substantially aligned with the central conduit 17 of the well 100. The detection apparatus 400 may include multiple magnetic-field generators 260 and multiple magnetic-field sensors 270 that are arranged in one or more arrays 201, as described herein above. The arrays 201 may be positionable around the tubular body 402 upon the outer surface. The arrays 201 may operate in the same manner as described herein above to detect changes in one or more properties of the magnetic field as ferromagnetic objects approach, move through or move away from the detection apparatus 400.

Figure 6:
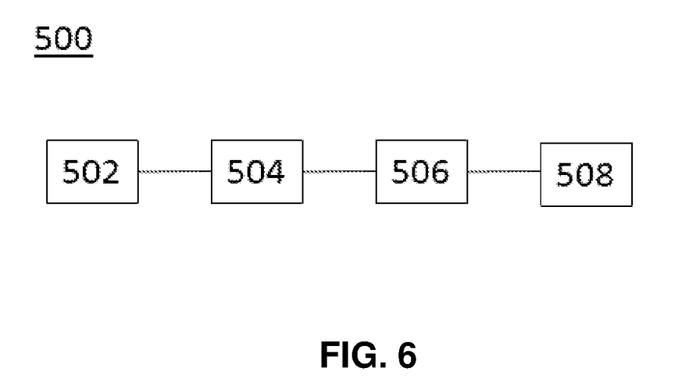
FIG. 6 shows one embodiment of the steps of a method for detecting the location of a line-attached tool within a well.

Some embodiments of the present disclosure relate to a method 500 for detecting the location of a line-attached tool during a well line operation (see FIG. 6). The method comprises the step of creating 502 a magnetic field within at least a portion of an above-surface-portion of the well. The method includes a step of detecting 504 one or more properties of the magnetic field. The step of detecting 504 may also include a step of detecting a change in the one or more properties of the magnetic field that are caused by the line-attached tool approaching, moving through or moving away from the magnetic field. The method further includes a step of communicating 506 an output signal to a processor that indicates the one or more detected properties and/or the detected change in the one or more detected properties of the magnetic field. In some embodiments of the present disclosure, the processor is configured to determine the location of the line-attached tool within or near to the magnetic field. The method may also include an optional step of generating 508 an output signal that alerts a user that the line-attached tool is near or at the above-surface-portion of the well proximal the magnetic field.

We claim:

1. An apparatus for detecting a line-attached tool that is moving through a well, the apparatus comprising:
    (a) a body that defines a central passageway for receiving the line-attached tool therethrough;
    (b) at least one magnetic-field generator that is configured to generate a magnetic field that extends at least partially across the central passageway;
    (c) at least one magnetic-field sensor that is configured for detecting a change in one or more properties of the magnetic field that are caused by the line-attached tool approaching, moving through or moving away from the magnetic field,
    wherein the at least one magnetic-field sensor is housed within the body and the body is connectible to the well below a lubricator of the well and,
    wherein the line-attached tool is attached to a wireline or a slickline; and
    (d) a processor that is configured to indicate a change in the one or more detected properties of the magnetic field,
    wherein the processor is configured to determine the location of the line-attached tool within or near to the magnetic field and wherein the processor is also configured to determine a position and a dimension of the line-attached tool, wherein the position includes a center coordinate, and wherein the determined dimension is a diameter, and wherein the processor is further configured to send a visual representation of the determined dimensions for viewing on an operator's screen.

2. The apparatus of claim 1, wherein the at least one magnetic-field generator is housed within the body.

3. The apparatus of claim 1, wherein the body is connectible with well in an arrangement where the central passage is substantially aligned with a central bore of the well.

4. The apparatus of claim 1, wherein the processor is configured to send the visual representation in real time.

5. A method for identifying a location of a line-attached tool while moving through an above-surface-portion of a well, the method comprising steps of:
    (a) creating a magnetic field within at least a portion of the above-surface-portion of the well;
    (b) detecting changes in one or more properties of the magnetic field that are caused by the line-attached tool approaching, moving through or moving away from the magnetic field, below a lubricator of the well;
    (c) communicating an output signal to a processor that indicates a change in the one or more detected properties of the magnetic field, wherein the processor is configured to determine the location of the line-attached tool within or near to the magnetic field and wherein the processor is also configured to determine a position and a dimension of the line-attached tool, wherein the position includes a center coordinate, and wherein the determined dimension is a diameter;
    (d) generating an output signal that alerts a user that the line-attached tool is near or at the above-surface-portion of the well proximal the magnetic field; and
    (e) sending a visual representation of the determined dimensions for viewing on an operator's screen.

6. The method of claim 1, wherein the line-attached tool is selected from the group consisting of a spang, a jar, a sinker bar, a perforation gun, a running tool, a pulling tool, a well logging tool and a bridge plug.

7. The method of claim 5, wherein the step of sending the visual representation is in real time.

* * * * *